United States Patent
Min et al.

(10) Patent No.: US 8,224,332 B2
(45) Date of Patent: Jul. 17, 2012

(54) METHOD FOR FORMING A MOVING NETWORK GROUP IN A MOBILE RELAY STATION AND MOBILE MULTI-HOP RELAY SYSTEM SUPPORTING THE SAME

(75) Inventors: Chan-Ho Min, Yongin-si (KR);
Young-Hyun Jeon, Guri-si (KR);
Jong-Hyung Kwun, Seongnam-si (KR);
Hyun-Soo Yoon, Daejeon (KR);
Han-Jin Lee, Daejeon (KR);
Dong-Wook Kim, Seoul (KR);
Seung-Woo Jeon, Seoul (KR); Sawhney Mrinalini, Daejeon (KR)

(73) Assignees: Samsung Electronics Co., Ltd.,
Suwon-si (KR); Korea Advanced Institute of Science and Technology (KAIST), Daejeon (KR)

( * ) Notice: Subject to any disclaimer, the term of this patent is extended or adjusted under 35 U.S.C. 154(b) by 609 days.

(21) Appl. No.: 12/380,708

(22) Filed: Mar. 3, 2009

(65) Prior Publication Data
US 2009/0227259 A1   Sep. 10, 2009

(30) Foreign Application Priority Data
Mar. 5, 2008   (KR) .................. 10-2008-0020739

(51) Int. Cl.
*H04W 36/00* (2009.01)
(52) U.S. Cl. ........ 455/444; 455/436; 455/438; 455/441; 455/456.1; 455/456.5; 370/331
(58) Field of Classification Search .......... 455/436–444, 455/456.1–456.6; 370/331
See application file for complete search history.

(56) References Cited

U.S. PATENT DOCUMENTS

| | | | |
|---|---|---|---|
| 2003/0235165 A1* | 12/2003 | Wang | 370/331 |
| 2005/0148334 A1* | 7/2005 | Peeters | 455/436 |
| 2007/0093201 A1* | 4/2007 | Hsu et al. | 455/3.04 |
| 2009/0092078 A1* | 4/2009 | Czaja et al. | 370/328 |
| 2009/0104911 A1* | 4/2009 | Watanabe et al. | 455/436 |
| 2009/0207804 A1* | 8/2009 | Chou et al. | 370/331 |

* cited by examiner

*Primary Examiner* — Marivelisse Santiago Cordero
*Assistant Examiner* — Dung Hong

(57) ABSTRACT

A method for forming a moving network group by a mobile relay station (MRS) in a mobile multi-hop relay (MMR) system is provided. The MRS determines whether a transportation means mounted with the mobile relay station is at a predetermined location derived from travel information. When a velocity information of the transportation means at the predetermined location is zero (0), the MRS determines whether to include a mobile station (MS) to the moving network group based at least partly upon a signal that the mobile station receives from the mobile relay station.

20 Claims, 4 Drawing Sheets

METHOD FOR FORMING A MOVING NETWORK GROUP IN A MOBILE RELAY STATION AND MOBILE MULTI-HOP RELAY SYSTEM SUPPORTING THE SAME

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 5, 2008 and assigned Serial No. 10-2008-20739, the disclosures of which are incorporated herein by reference.

TECHNICAL FIELD OF THE INVENTION

The present invention relates generally to forming a moving network in a Mobile Multi-Hop Relay (MMR) system and, in particular, to a method and system for forming a moving network group that will receive services provided from a Mobile Relay Station (MRS) in an MMR system.

BACKGROUND OF THE INVENTION

In mobile communication systems, Relay Stations (RSs) have been introduced to remove shadow areas. Relay technology is evolving from the simple Amplify-and-Forward scheme into an intellectual scheme such as Decode-and-Forward, Reconfiguration/Reallocation-and-Forward, and so forth. Particularly, in the next-generation mobile communication system, the introduction of multiple intellectual relays is inevitable to reduce installation cost for an increased number of Base Stations (BSs) and maintenance cost for the backhaul communication network, and at the same time to expand the communication coverage and improve the data throughput.

In the MMR system, RSs can be classified according to mobility, data forwarding scheme, diversity, wireless access technology, and so forth.

Regarding the detailed classification of RSs according to the mobility, the RSs can be classified into a fixed type, a nomadic type and a mobile type. The Fixed RS (FRS), which is the most popular type, is fixedly installed in shadow areas so that users can be supported to seamlessly receive services even in the shadow areas. The Nomadic RS (NRS) is installed in the places of, for example, events or exhibitions, where many users are gathering temporarily, to provide the users with seamless services. The Mobile RS (MRS) may be installed in a transportation means such as trains and buses, to provide services to mobile stations (MSs) on board the transmission means or to MSs in a user group.

A moving network is formed by MSs that are located inside the transportation means together with the MRS and receive services provided from the MRS, such as the MSs belonging to service coverage of the MRS. Herein, a set of the MSs forming the moving network is referred to as a "moving network group."

Accordingly, there is a need for a technology capable of determining whether a group of MSs is formed that uses an MRS forming a moving network, and efficiently providing services to MSs belonging to a corresponding group.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention provides a method and system for forming a moving network group using an MRS in an MMR system.

Further, an aspect of the present invention provides a method and system for forming a moving network group using travel information of a transportation means mounted with an MRS and a signal from an MS.

Moreover, an aspect of the present invention provides a method and system for forming a moving network group associated with a non-transparent MRS and a transparent MRS.

In addition, an aspect of the present invention provides a method and system for forming a moving network group using travel information of a transportation means mounted with a non-transparent MRS and strength of a downlink signal.

Moreover, an aspect of the present invention provides a method and system for forming a moving network group using travel information of a transportation means mounted with a transparent MRS and strength of an uplink signal.

According to one aspect of the present invention, a method for forming a moving network group by a mobile relay station (MRS) in a mobile multi-hop relay (MMR) system is provided. The method includes determining whether a transportation means mounted with the mobile relay station is at a predetermined location derived from travel information; and when a velocity information of the transportation means at the predetermined location is zero (0), determining whether to include a mobile station (MS) to the moving network group based at least partly upon a signal that the mobile station receives from the mobile relay station.

According to another aspect of the present invention, a method for forming a moving network group by a mobile relay station (MRS) in a mobile multi-hop relay (MMR) system is provided. The method includes determining whether a transportation means mounted with the mobile relay station is at a predetermined location derived from travel information; and when a velocity information of the transportation means mounted at the predetermined location is zero (0), determining whether to include a mobile station (MS) to the moving network group based at least partly upon a signal transmitted by the mobile station to a base station (BS).

According to further another aspect of the present invention, a system for forming a moving network group in a mobile multi-hop relay (MMR) system is provided. The system includes a mobile relay station (MRS) mounted on a transportation means, for determining whether the transportation means is at a predetermined location derived from travel information, and determining whether to include a mobile station (MS) in the moving network group based at least partly upon a signal that the mobile station receives from the mobile relay station, when a velocity information of the transportation means at the predetermined location is zero (0).

According to yet another aspect of the present invention, a system for forming a moving network group in a mobile multi-hop relay (MMR) system is provided. The system includes a mobile relay station (MRS) mounted on a transportation means, for determining whether the transportation means is at a predetermined location derived from travel information, and determining whether to include a mobile station (MS) in the moving network group based at least partly upon a signal transmitted by the mobile station to a base station (BS), when a velocity information of the transportation means at the predetermined location is zero (0).

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
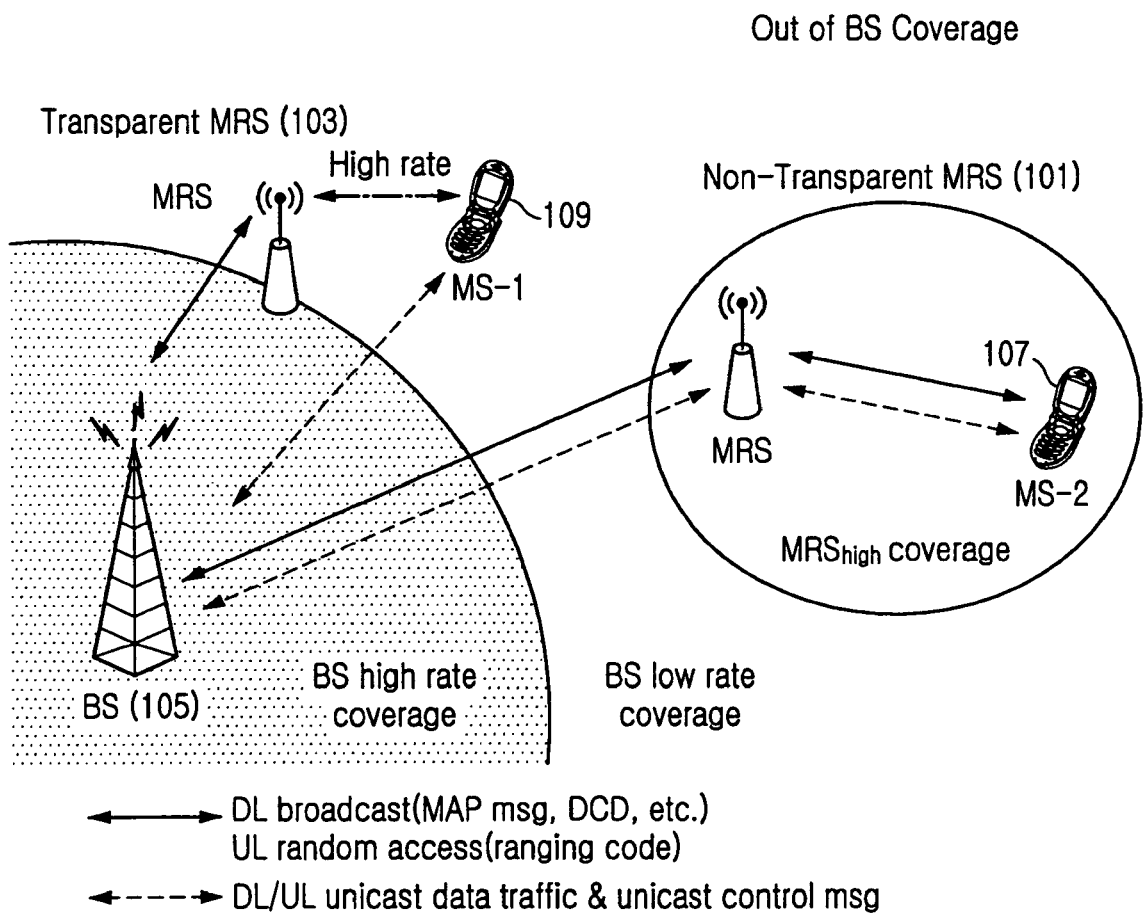
FIG. 1 is a diagram illustrating two types of MRSs which are divided according to their introduction purpose.

FIG. 1 illustrates two types of MRSs which are divided according to their introduction purpose.

As shown in FIG. 1, MRSs of an MMR system can be classified into a non-transparent MRS and a transparent MRS according to their introduction goals.

A non-transparent MRS 101 has been introduced for an MS-2 107 that cannot receive services provided from a BS 105 as it is located out of coverage of the BS 105, so that the cell coverage of the BS 105 can be expanded by the non-transparent MRS 101. The non-transparent MRS 101 can relay both a control channel and a data channel, and performs a process, such as initial network entry and ranging, on behalf of the MS-2 107. Therefore, complexity and capability of the non-transparent MRS 101 should be higher than that of a transparent MRS 103.

Regarding the transparent MRS 103, an MS-1 109 can receive only the control signal broadcasted from the BS 105 due to its low signal quality even though it is located within coverage of the BS 105. In this case, the transparent MRS 103 amplifies the data signal the MS-1 109 fails to receive, and delivers the amplified signal to the MS-1 109. Hence, the transparent MRS 103 has been introduced not to expend its cell coverage, but to improve throughput of data signals. The transparent MRS 103 can be considered as a cooperative relay scheme in terms of diversity, and it can also be regarded as a centralized scheme as the BS 105 directly controls a link between the MRS and the MS.

A moving network group proposed by the present invention refers to a set of MSs forming a moving network. Herein, the moving network is formed by the MSs that are located inside a transportation means together with an MRS installed in the transportation means such as buses and trains, and receive services provided from the MRS.

Figure 2:
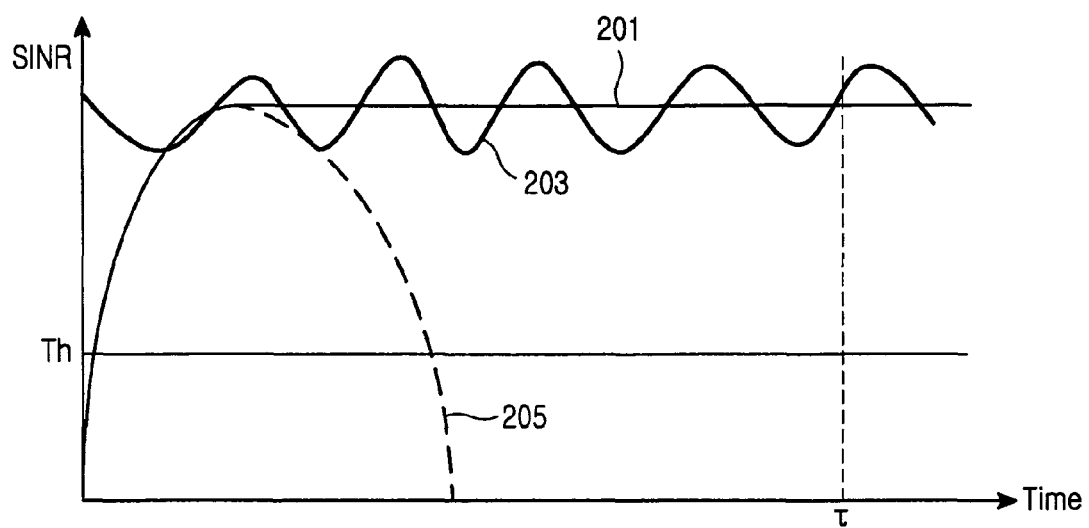
FIG. 2 is a graph illustrating a change in variables, i.e. signal strengths for MSs with the passage of time, considered in a moving network group forming method according to the present invention.

FIG. 2 is a graph illustrating a change in variables, i.e. signal strengths for MSs with the passage of time, considered in a moving network group forming method according to the present invention.

Referring to FIG. 2, a Signal to Interference and Noise Ratio (SINR) for an MS 201 on board a bus gradually increases while the MS 201 is getting on the bus, but is maintained constantly after the MS 201 gets into the bus. An MS 203 that moves along the same route as the bus while staying in the vicinity of the bus without boarding the bus, causes a fluctuation in its SINR due to a path loss. Concerning an MS 205 that gets off shortly after getting on the bus, its SINR gradually increases while the MS 204 is getting on, and abruptly decreases after the MS 204 gets off the bus.

Embodiments of the present invention will now be described in detail with reference to the accompanying drawings.

Herein, a method for forming a moving network group using the non-transparent MRS will be presented as a first embodiment, while a method for forming a moving network group using the transparent MRS will be presented as a second embodiment.

A. First Embodiment

Figure 3:
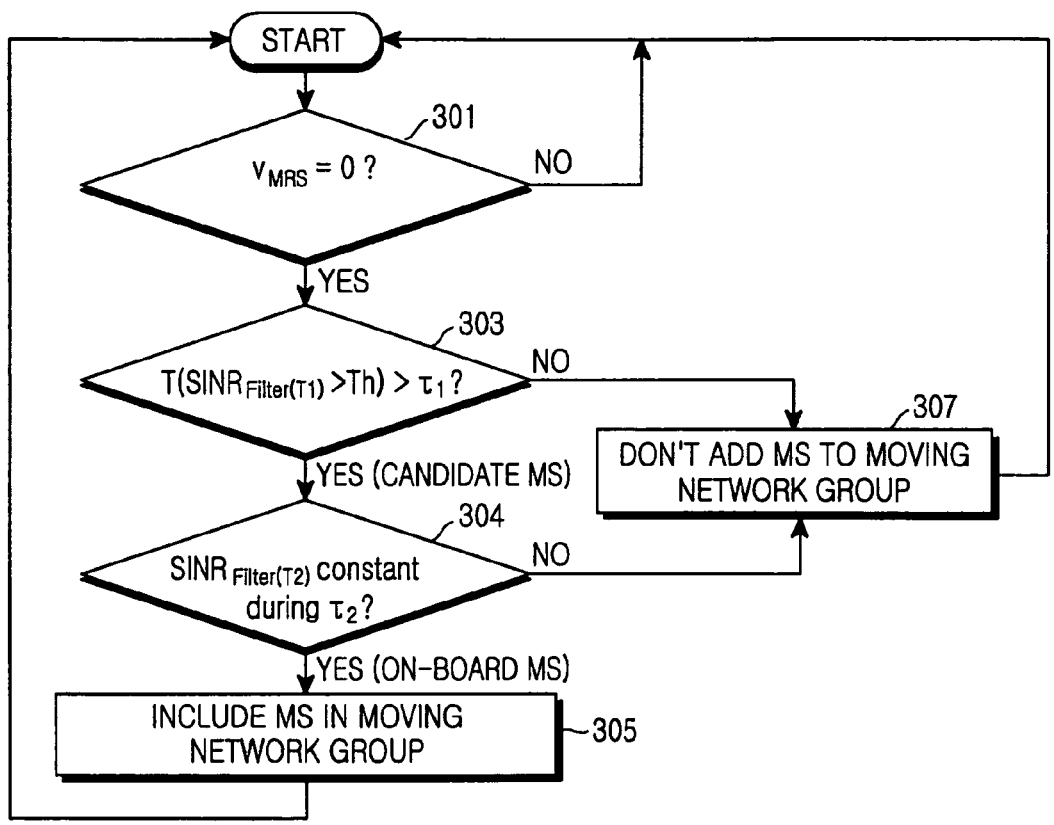
FIG. 3 is a flowchart illustrating a process of forming a moving network group using a non-transparent MRS according to a first embodiment of the present invention.

FIG. 3 is a flowchart illustrating a process of forming a moving network group using a non-transparent MRS according to a first embodiment of the present invention.

For a better understanding of the first embodiment of the present invention, a transportation means mounted with an MRS that relays communication between a BS and an MS will be assumed to be a bus, which is a public transportation means running in an urban area. The transportation means can include a train, a ship, and so forth, as well as the bus. The bus has its specific route, and it is possible to check travel information of the bus using the specific route with assistance of a position detection technology such as a Global Positioning System (GPS) installed in the bus. The travel information can include velocity information, direction information, and location information of the bus.

The first embodiment provides an exemplary method for forming a moving network group of the MS-2 107 which is on board a bus mounted with the non-transparent MRS 101.

The non-transparent MRS 101 can enable communication between the MS-2 107 and the BS 105 by relaying both a control channel and a data channel as described in FIG. 1, and transmits its own unique control information (Preamble, Frame Control Header (FCH), Downlink MAP (DL-MAP), etc.) being different from what the BS 105 transmits, to at least one MS-2 107 located in its surroundings.

In the first embodiment of the present invention, it will be assumed that the non-transparent MRS 101 includes its own GPS, or receives travel information of the bus from a GPS installed in the bus.

Referring to FIG. 3, a non-transparent MRS determines in step 301 if it is at a predetermined location, using travel information of the bus, and also determines whether a velocity $V_{MRS}$ of the bus is 0. The predetermined location refers to a place where a passenger with an MS may enter or leave the moving network group, like the bus stops for example, and it can be derived from the travel information of the bus. If it is determined in step 301 that $V_{MRS}=0$ at the predetermined location acquired from the travel information, the non-transparent MRS proceeds to step 303, and when $V_{MRS}\neq 0$, the Non-transparent MRS repeats step 301.

The non-transparent MRS can determine strength of a signal that an MS receives, based on a Channel Quality Indicator (CQI) for a downlink signal. When a passenger with an MS gets on the bus, the MS is located in close vicinity of the non-transparent MRS. Therefore, strength of a signal that the MS receives from the non-transparent MRS is higher than or equal to a predetermined threshold. However, not all of the MSs, received signal strengths of which are higher than or equal to the threshold, can be determined as MSs which are on board the bus. This is because the MS may get off the bus shortly after getting on, or the MS may move along the same route as the bus while staying in the vicinity of the bus without boarding the bus, as illustrated in FIG. 2.

In step 303, the non-transparent MRS determines whether a strength of a downlink signal of a corresponding MS satisfies a first condition using Equation 1, and at least one MS satisfying the first condition is determined as a candidate MS that is to be considered to be included in a moving network group.

$$T(SINR_{Filtered(T1)} > Th) > \tau_1, \quad [\text{Eqn. 1}]$$

where $SINR_{Filtered(T1)}$ denotes a strength of a signal, which is filtered for a predetermined period T1 to remove fast fading. That is, using Equation 1, the non-transparent MRS determines whether $SINR_{Filtered(T1)}$ that an MS receives exceeds a predetermined first threshold Th for more than a predetermined first time $\tau_1$, in order to delete the MS 205 that gets off shortly after getting on the bus as illustrated in FIG. 2, from a list of the candidate MSs. The $\tau_1$ can be determined as a time required when the non-transparent MRS reaches a predetermined maximum velocity $V_{max}$.

Meanwhile, there is a need for a process of more correctly determining the candidate MS because the MS 203 that moves along the same route as the bus while staying in the vicinity of the bus without boarding the bus, has not yet been deleted from the candidate MS list.

Therefore, the non-transparent MRS determines in step 304 whether strength of a filtered signal is fluctuating or not, for at least one candidate MS satisfying the first condition. In other words, the non-transparent MRS determines whether the candidate MS, detected in step 303, satisfies a second condition in which $SINR_{Filtered(T2)}$ of a signal filtered for a predetermined second period T2 set longer than the T1 is constant during a predetermined second time $\tau_2$, thereby improving accuracy of forming a moving network group.

If it is determined in step 304 that the second condition is satisfied, the non-transparent MRS includes at least one on-board MS satisfying the second condition in the moving network group in step 305. Otherwise, the non-transparent MRS does not include an MS not satisfying the second condition in the moving network group in step 307.

In an alternative embodiment, though not illustrated, the non-transparent MRS determines whether the on-board MS included in the moving network group satisfies the first condition and the second condition every predetermined third period T3, and deletes from the moving network group the on-board MS that does not satisfy either the first condition or the second condition.

The operation of the non-transparent MRS shown in FIG. 3 is repeatedly performed every time the bus stops, i.e. every time $V_{MRS}=0$ at a predetermined location.

As described above, the first embodiment of the present invention provides a method for forming a moving network group using the non-transparent MRS.

B. Second Embodiment

Figure 4:
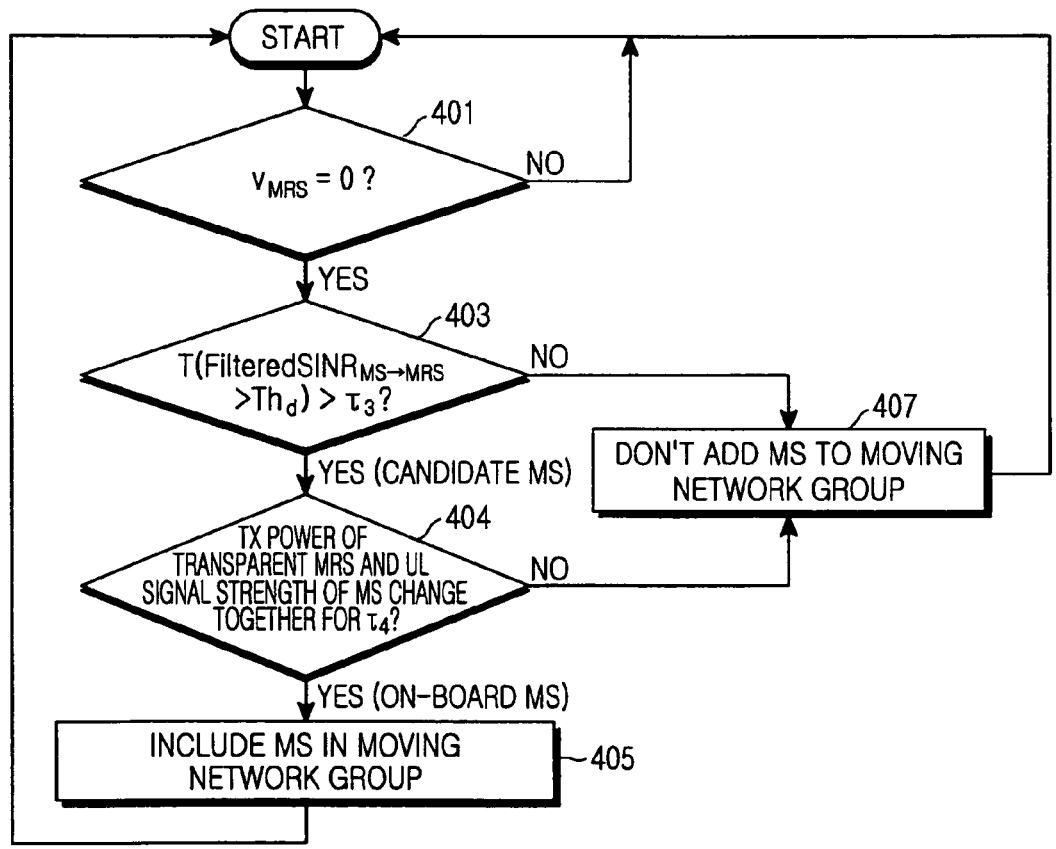
FIG. 4 is a flowchart illustrating a process of forming a moving network group using a transparent MRS according to a second embodiment of the present invention.

FIG. 4 is a flowchart illustrating a process of forming a moving network group using a transparent MRS according to a second embodiment of the present invention.

Even in the second embodiment of the present invention, a transportation means mounted with an MRS that relays communication between a BS and an MS will be assumed to be a bus running in an urban area. The second embodiment provides an exemplary method for forming a moving network group of the MS-1 109 which is on board a bus mounted with the transparent MRS 103.

The transparent MRS 103 mainly amplifies data signals and delivers them to the MS-1 109 as described in FIG. 1. The transparent MRS 103 may include its own GPS, or receive travel information of the bus from a GPS installed in the bus.

Referring to FIG. 4, the transparent MRS determines in step 401 if it is at a predetermined location, using travel information of the bus, and also determines whether a velocity $V_{MRS}$ of the bus is 0 at a predetermined location. If it is determined in step 401 that $V_{MRS}=0$ at the predetermined location derived from the travel information, the transparent MRS proceeds to step 403. Otherwise, when $V_{MRS}\neq 0$, the transparent MRS repeats step 401.

Since the transparent MRS does not transmit its own control information to an MS, the MS cannot recognize the transparent MRS. However, the transparent MRS can determine strength of an uplink signal that at least one MS located in its surroundings transmits to the BS. That is, though no communication channel is formed between the transparent MRS and the MS, a CQI value reported by the MS to the BS can be measured by the transparent MRS which is located closer to the MS compared to the BS. Meanwhile, since the uplink is subject to power control, the strength of the uplink signal significantly varies according to the location of its MS. Therefore, using Equation 2, the transparent MRS determines in step 403 whether the corresponding MS satisfies a third condition, and at least one MS satisfying the third condition is determined as a candidate MS that is to be considered to be included in the moving network group.

$$T(FilteredSINR_{MS \to MRS} > Th_d) > \tau_3, \quad [\text{Eqn. 2}]$$

where $FilteredSINR_{MS \to MRS}$ denotes a value obtained by filtering the strength of an uplink signal from an MS, measured by the transparent MRS, and a second threshold $Th_d$ represents a value determined according to the distance between a BS and the transparent MRS. That is, the transparent MRS determines whether $FilteredSINR_{MS \to MRS}$ exceeds $Th_d$ for more than a predetermined third time $\tau_3$.

Meanwhile, there is a need for a process of more correctly determining candidate MS because the MS 203 that moves along the same route as the bus while staying in the vicinity of the bus without boarding the bus, has not yet been deleted from the candidate MS list.

Therefore, the transparent MRS determines in step 404 whether strength of a filtered signal fluctuates or not, for at least one candidate MS satisfying the third condition. In other words, the transparent MRS determines whether the candidate MS, detected in step 403, satisfies a fourth condition in which transmission power of the transparent MRS and the strength of the uplink signal of the candidate MS increase or decrease together for more than a predetermined fourth time $\tau_4$.

If the transparent MRS and the MS move far away from the BS, the transmission power for both the transparent MRS and the MS increases, and the strength of an uplink signal of the MS, measured by the transparent MRS, also increases. Hence, if the strength of the uplink signal of the MS, measured by the transparent MRS, increases when the transmission power of the transparent MRS increases, the transparent MRS determines that the transparent MRS and the MS move together, without the need to know the correct strength of the transmission signal of the MS. That is, when the transparent MRS and the MS move together, the transmission power of the transparent MRS and the strength of an uplink signal of the MS, measured by the transparent MRS, also increase or decrease together.

If it is determined in step 404 that the fourth condition is satisfied, the transparent MRS includes at least one on-board MS satisfying the fourth condition in the moving network group in step 405. Otherwise, the transparent MRS does not include an MS not satisfying the fourth condition in the moving network group in step 407.

In an alternative embodiment, though not illustrated, the transparent MRS determines whether the on-board MS included in the moving network group satisfies the third condition and the fourth condition every predetermined fourth period T4, and deletes from the moving network group the on-board MS that does not satisfy either the third condition and the fourth condition.

The operation of the transparent MRS shown in FIG. 4 is repeatedly performed every time the bus stops ($V_{MRS}$=0) at the predetermined location.

As described above, the second embodiment of the present invention provides a method for forming a moving network group based on travel information of the transportation means and signal strength by the transparent MRS 103.

For example, when the non-transparent MRS is used according to the first embodiment of the present invention, it is possible to provide a moving network group forming method in which the MS directly determines the first condition and the second condition, and reports the determination results to the non-transparent MRS.

As is apparent from the foregoing description, in accordance with embodiments of the present invention, the MRS forming the moving network determines whether MSs are included in the moving network group and correctly manages the moving network group, making it possible to efficiently provide services to the MSs belonging to the moving network group.

Further, the present invention forms the moving network group based on the signal strength rather than the distance information which may be affected by several types of fading, taking into account the MRS used in an urban area environment. Thus, the novel method can correctly determine the forming of the moving network group, compared with the method based on the distance information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for forming a moving network group by a mobile relay station (MRS) in a mobile multi-hop relay (MMR) system, the method comprising:
   determining, by the mobile relay station, whether a transportation means mounted with the mobile relay station is at a predetermined location derived from travel information;
   when a velocity information of the transportation means at the predetermined location is zero (0), determining, by the mobile relay station, whether to include a mobile station (MS) to the moving network group based at least partly upon a signal that the mobile station receives from the mobile relay station, the determining comprising:
      determining the mobile station as a candidate mobile station when the mobile station satisfies a first condition in which a strength of the signal received from the mobile relay station for a predetermined first period exceeds a predetermined first threshold for a first time; and
      determining, by the mobile relay station, the candidate mobile station as an on-board mobile station when the candidate mobile station satisfies a second condition in which the strength of the signal received from the mobile relay station for a predetermined second period is maintained constantly for a predetermined second time, and including the on-board mobile station in the moving network group; and
   determining whether the on-board mobile station satisfies the first condition and the second condition, whenever the velocity information of the transportation means at the predetermined location is zero (0), and deleting the on-board mobile station from the moving network group when the on-board mobile station fails to satisfy at least one of the first and second conditions.

2. The method of claim 1, wherein the first time is at least one of a predetermined time and a time required for the mobile relay station to reach a predetermined maximum velocity.

3. The method of claim 1, wherein the mobile relay station is a transparent mobile relay station located in a coverage area of a corresponding base station.

4. The method of claim 1, wherein the mobile relay station is a non-transparent mobile relay station located outside a coverage area of a corresponding base station.

5. The method of claim 1, wherein the transportation means is one of a bus and a train.

6. The method of claim 1, wherein the strength of the signal received from the mobile relay station is determined based on a Signal to Interference and Noise Ratio (SINR).

7. The method of claim 1, wherein the travel information of the transportation means is determined according to a Global Positioning System (GPS) associated with the transportation means.

8. A system for forming a moving network group in a mobile multi-hop relay (MMR) system, the system comprising:
   a mobile relay station (MRS) mounted on a transportation means, the mobile relay station configured to determine whether the transportation means is at a predetermined location derived from travel information, and determine whether to include a mobile station (MS) in the moving network group based at least partly upon a signal that the mobile station receives from the mobile relay station, when a velocity information of the transportation means at the predetermined location is zero (0), wherein the mobile relay station is further configured to:
  determine the mobile station as a candidate mobile station when the mobile station satisfies a first condition in which a strength of the signal received from the mobile relay station for a predetermined first period exceeds a predetermined first threshold for a first time;
  determine the candidate mobile station as an on-board mobile station when the candidate mobile station satisfies a second condition in which the strength of the signal received from the mobile relay station for a predetermined second period is maintained constantly for a predetermined second time, and include the on-board mobile station in the moving network group; and
  determine whether the on-board mobile station satisfies the first condition and the second condition, whenever the velocity information of the transportation means at the predetermined location is zero (0), and delete the on-board mobile station from the moving network group when the on-board mobile station fails to satisfy at least one of the first and second conditions.

9. The system of claim 8, wherein the first time is at least one of a predetermined time and a time required for the mobile relay station to reach a predetermined maximum velocity.

10. The system of claim 8, wherein the mobile relay station is a transparent mobile relay station located in a coverage area of a corresponding base station.

11. The system of claim 8, wherein the mobile relay station is a non-transparent mobile relay station located outside a coverage area of a corresponding base station.

12. The system of claim 8, wherein the transportation means is one of a bus and a train.

13. The system of claim 8, wherein the strength of the signal received from the mobile relay station is determined based on a Signal to Interference and Noise Ratio (SINR).

14. The system of claim 8, wherein the travel information of the transportation means is determined according to a Global Positioning System (GPS) associated with the transportation means.

15. A mobile relay station configured to be mounted on a transportation mean, and capable of forming a moving network group in a mobile multi-hop relay (MMR) system, the mobile relay station comprising:

a processor configured to:
  determine whether the transportation means is at a predetermined location derived from travel information, and determine whether to include a mobile station in the moving network group based at least partly upon a signal that the mobile station receives from the mobile relay station, when a velocity information of the transportation means at the predetermined location is zero (0);
  determine the mobile station as a candidate mobile station when the mobile station satisfies a first condition in which a strength of the signal received from the mobile relay station for a predetermined first period exceeds a predetermined first threshold for a first time;
  determine the candidate mobile station as an on-board mobile station when the candidate mobile station satisfies a second condition in which the strength of the signal received from the mobile relay station for a predetermined second period is maintained constantly for a predetermined second time, and include the on-board mobile station in the moving network group; and
  determine whether the on-board mobile station satisfies the first condition and the second condition, whenever the velocity information of the transportation means at the predetermined location is zero (0), and delete the on-board mobile station from the moving network group when the on-board mobile station fails to satisfy at least one of the first and second conditions.

16. The mobile relay station of claim 15, wherein the first time is at least one of a predetermined time and a time required for the mobile relay station to reach a predetermined maximum velocity.

17. The mobile relay station of claim 15, wherein the mobile relay station is a transparent mobile relay station located in a coverage area of a corresponding base station.

18. The mobile relay station of claim 15, wherein the mobile relay station is a non-transparent mobile relay station located outside a coverage area of a corresponding base station.

19. The mobile relay station of claim 15, wherein the transportation means is one of a bus and a train.

20. The mobile relay station of claim 15, wherein the strength of the signal received from the mobile relay station is determined based on a Signal to Interference and Noise Ratio (SINR).

* * * * *